(12) United States Patent
Shimizu

(10) Patent No.: US 8,337,072 B2
(45) Date of Patent: Dec. 25, 2012

(54) STIRRING TOOL HAVING BLADES SUPPORTED AT RADIALLY INWARD EDGE

(75) Inventor: Takashi Shimizu, Seki (JP)

(73) Assignee: Kai R & D Center Co., Ltd., Gifu (JP)

( * ) Notice: Subject to any disclaimer, the term of this patent is extended or adjusted under 35 U.S.C. 154(b) by 259 days.

(21) Appl. No.: 12/800,040

(22) Filed: May 6, 2010

(65) Prior Publication Data

US 2010/0300304 A1    Dec. 2, 2010

(30) Foreign Application Priority Data

May 27, 2009   (JP) ................................. 2009-127589

(51) Int. Cl.
*B01F 7/00* (2006.01)
(52) U.S. Cl. ........................................ 366/129; 366/305
(58) Field of Classification Search .................. 366/129, 366/279, 262–265, 270, 302, 305, 342–343; 241/2, 46.11, 246, 101.8; 435/316.1, 306.1
See application file for complete search history.

(56) References Cited

U.S. PATENT DOCUMENTS

| | | | |
|---|---|---|---|
| 2,541,221 A * | 2/1951 | Edwards | 366/264 |
| 3,251,580 A * | 5/1966 | Adams | 366/343 |
| 3,724,765 A * | 4/1973 | Rohrbaugh et al. | 241/46.06 |
| 4,439,043 A | 3/1984 | Daloz | |
| 4,745,068 A * | 5/1988 | Godfrey et al. | 435/306.1 |
| 6,398,402 B1 * | 6/2002 | Thomas et al. | 366/129 |
| 7,056,009 B2 * | 6/2006 | Jagle et al. | 366/129 |
| 2010/0300304 A1 * | 12/2010 | Shimizu | 99/348 |
| 2011/0220751 A1 * | 9/2011 | Jagle | 241/101.8 |
| 2012/0237925 A1 * | 9/2012 | Isely et al. | 435/306.1 |

FOREIGN PATENT DOCUMENTS

| | | |
|---|---|---|
| JP | 50-48892 | 5/1975 |
| JP | 52-108281 | 8/1977 |
| JP | 58-27532 | 2/1983 |
| JP | 2005-052512 | 3/2005 |

* cited by examiner

*Primary Examiner* — Charles E Cooley
(74) *Attorney, Agent, or Firm* — Jordan and Hamburg LLP

(57) ABSTRACT

Disclosed is a stirring tool which is capable of fully and efficiently mixing ingredients such as mayonnaise even in relatively small amounts. A stirring blade is mounted on a rotating shaft which is rotated by a driving force. A hollow blade cover is provided which covers the periphery of the rotating stirring blade and a portion of the edge of the stirring blade constitutes a long edge which is an edge part that faces the inner circumferential face and which extends along the inner circumferential face of the blade cover. Openings which are holes and an opening are provided at the end of the blade cover and in a peripheral wall of the blade cover for circulation of the stirred ingredients. The long edge can be seen through the holes in the peripheral wall when the rotating blade rotates.

16 Claims, 7 Drawing Sheets

STIRRING TOOL HAVING BLADES SUPPORTED AT RADIALLY INWARD EDGE

TECHNICAL FIELD

The present invention relates to a stirring tool which is used primarily for preparing fluid and semi-fluid foods such as mayonnaise and dressings in ordinary households.

BACKGROUND OF THE INVENTION

Mayonnaise and dressings sold by mass retailers usually contain preservatives and therefore have a relatively long shelf life, making it possible to use them over an extended period of time. For this reason, they are sold in relatively large containers. However, because preservatives are not added when mayonnaise, dressing and the like are made in ordinary households, it is desirable that these be made in smaller quantities than those of market-available containers for mayonnaise and the like, and that these be consumed quickly. It is a matter of course that conventional industrial tools for preparing mayonnaise serve to prepare relatively large amounts of mayonnaise, but this is also true of conventional household tool for preparing mayonnaise, in which stirring blades are inserted into a cylindrical container, the blades being large enough to fill the container, and the ingredients are stirred.

In this case, if one reduces the amount of ingredients and fills the container to 20 or 30% full with ingredients, in order to make a small amount of mayonnaise, the ingredients will just adhere to the inner circumferential face of the container when stirred, meaning that the ingredients cannot be properly stirred. Accordingly, it is necessary to fill the container to at least approximately 70% full with ingredients. In order to fill the container to approximately 70% full when relatively small amounts of ingredients are added, it is necessary that the bottom of the container have a small area. That is to say, the container must be a narrow cylinder. However, if the container is a narrow cylinder, and the stirring blades are rotated with this filled 70% full with ingredients, the ingredients will fully receive the rotational force of the stirring blades and thus, as a result of the centrifugal force, the ingredients will travel up the inner circumferential face of the container, and spill out from the container. In order to prevent spilling, it is desirable that the distance between the stirring blades and the inner circumferential face of the container be increased, but in this case it is not possible to fully and efficiently mix the dressing. Furthermore, there exist hand mixers for general household use, which serve to stir relatively small quantities of food stuff, but these are primarily directed at stirring in combination with grinding of solids such as beans, small fish and sesame seeds, and these are unsuited to making mayonnaise and dressing.

Furthermore, conventional stirring equipment for mayonnaise and dressing is not capable of maintaining fine particles of oil and egg yolk, or oil and water, which are the ingredients, in a homogeneous state. This not only results in inferior taste and texture, but disadvantages have been noted such as the emulsified state only being maintained for a short time, with the ingredients rapidly separating and returning to their original states.

Patent Document 1 JP-52-108281-A
Patent Document 2 JP-2005-052512-A

Conventional mayonnaise preparation tools are not intended for the preparation of relatively small amounts of mayonnaise for ordinary households. Furthermore, they are not capable of maintaining fine particles of oil and egg yolk, or oil and water, which are the ingredients, in a uniform state.

Thus, the present invention is directed at providing a stirring tool which is capable of fully and efficiently mixing ingredients such as mayonnaise, so that fine particles of the ingredients are maintained in a uniform state, even with relatively small amounts of ingredients.

SUMMARY OF THE INVENTION

The present invention has an arrangement in which a stirring blade is mounted on a rotating shaft which is rotated by a driving force. A hollow blade cover is provided which covers the periphery of the rotating stirring blade and a portion of the edge of the stirring blade constitutes an edge part that faces the inner circumferential face which extends along the inner circumferential face of the blade cover. Openings are provided at the end of the blade cover and in a peripheral wall of the blade cover for circulation of the stirred ingredients. At least a portion of the edge part that faces the inner circumferential face can be seen through an opening when the rotating blade rotates. The opening provided in the peripheral wall of the blade cover is a hole and the hole is formed so as to be axially elongate.

The axial length of the edge part that faces the inner circumferential face, projected in a direction perpendicular to the axis of rotation, is no less than the axial length of the hole, and the portion corresponding to the axial length of the edge part that faces the inner circumferential face, projected in a direction perpendicular to the axis, extends over the entire axial length of the hole.

A gap between the edge part that faces the inner circumferential face and the inner circumferential face of the blade cover is no greater than 1.0 mm.

The number of stirring blades is less than the number of openings provided in the peripheral wall of the blade cover.

The stirring blade is mounted on a rotating shaft which is rotated by a driving force. A hollow blade cover is provided which covers the periphery of the rotating stirring blade and the plane constituted by the inner circumferential face of the blade cover is cylindrical. Openings are provided at the end of the blade cover and in a peripheral wall of the blade cover for circulation of stirred ingredients.

A hollow blade cover is provided which covers the periphery of the rotating stirring blade. A portion of the edge of the stirring blade constitutes an edge part that faces the inner circumferential face and which extends along the inner circumferential face of the blade cover. Openings are provided at the end of the blade cover and in a peripheral wall of the blade cover for circulation of the stirred ingredients. At least a portion of the edge part that faces the inner circumferential face can be seen through an opening when the rotating blade rotates. Accordingly, when making mayonnaise, dressing or the like, the mixing together of the ingredients occurs within the blade cover, and when the stirring blade reaches a position at which it can be seen through the opening, a portion of the ingredients flows out to the exterior of the blade cover via the opening. Thus, because the ingredients at the exterior of the stirring blade cover are not subjected to the full rotational force, there is no risk of the ingredients spilling out from the container. Consequently, even if small quantities of ingredients are placed in a relatively small narrow cylindrical container, for example, the ingredients can be mixed together without spilling. Furthermore, because an edge part of the stirring blade that faces the inner circumferential face extends along the inner circumferential face of the blade cover, mixing together of the ingredients occurs in the narrow gap between the edge part that faces the inner circumferential face and the inner circumferential face of the blade cover, whereby the ingredients can be mixed together efficiently.

The opening provided in the peripheral wall of the blade cover is a hole. Accordingly, the ingredients flow through the hole in a constant manner, whereby the ingredients can be mixed together efficiently. Supposing that the opening were not a hole, but rather a cutaway extending upward from the end of the peripheral wall of the blade cover, this opening and the opening provided at the end of the peripheral wall would then communicate. Consequently, the ingredient flow would be disturbed in the portion where the two openings communicate, and thus the stirring efficiency would be somewhat inferior.

The hole is formed so as to be axially elongate. Because the hole is formed so as to be elongate, the quantity of ingredients circulating therethrough is increased, whereby the ingredients can be mixed together efficiently. Furthermore, because of the hole is axially elongate rather than circumferentially elongate, a plurality of holes can be provided. The edge of the hole is effective in dividing the ingredients, and by increasing the number of holes, efficient stirring is made possible. In addition, because the holes are narrow in the circumferential direction, the length of time for which the edge part of the stirring blade that faces the inner circumferential face is facing the inner circumferential face of the blade cover is correspondingly increased, so that the ingredients can be effectively mixed together in the narrow gap between the edge part that faces the inner circumferential face and the inner circumferential face of the blade cover.

The axial length of the edge part that faces the inner circumferential face, projected in a direction perpendicular to the axis of rotation, is no less than the axial length of the hole, and the portion corresponding to the axial length of the edge part that faces the inner circumferential face, projected in a direction perpendicular to the axis, extends over the entire axial length of the hole. Accordingly, the stirring blades circulate the ingredients using the entire axial length of the holes, whereby the ingredients can be mixed together efficiently.

The gap between the edge part that faces the inner circumferential face and the inner circumferential face of the blade cover is no greater than 0.1 mm. Accordingly, because multiple ingredients are mixed together in this narrow gap, the ingredients are immediately intermingled, whereby they can be mixed together efficiently. Thus, because it is possible to reduce the oil and egg yolk, or oil and water, which are the ingredients, to fine particles and to maintain a uniform state, without detriment to the flavor or texture, the emulsified state is maintained for a long period of time, without the ingredients returning to their original states. Furthermore, because the oil is reduced to fine particles, the surface area of the oil increases, allowing the same flavor to be produced with a small amount of oil. Furthermore, because the amount of oil used is limited, the flavor can be improved in ways such as bringing out the flavor without stickiness.

The number of stirring blades is less than the number of openings provided in the peripheral wall of the blade cover. In terms of the number of stirring blades, one part that extends in the radial direction from the rotating shaft is counted as one stirring blade. Accordingly, a stirring blade that extends in both radial directions, centered on the rotating shaft, is counted as two stirring blades. Supposing that the number of stirring blades was greater than the number of openings, a portion of the ingredients that would otherwise be caused to flow out from the openings by the stirring blades, would not flow out, and would remain for a slightly time longer period of time, and therefore the stirring efficiency would be inferior. If the number of stirring blades is less than the number of openings, the ingredient flow is such that the ingredients constantly flow out from the openings, whereby the ingredients can be mixed together efficiently.

A stirring blade is mounted on a rotating shaft, which is rotated by a driving force; a hollow blade cover is provided, which covers the periphery of the rotating stirring blade; the plane constituted by the inner circumferential face of the blade cover is cylindrical; and openings are provided at the end of the blade cover and in a peripheral wall of the blade cover, for circulation of the stirred ingredients. Accordingly, when mayonnaise, dressing or the like is made, the mixing together of the ingredients occurs within the blade cover, and because the plane constituted by the inner circumferential face of the blade cover is cylindrical, the ingredients at the exterior of the blade cover are not subjected to the full rotational force of the stirring blades, and therefore there is no risk of the ingredients spilling out from the container. Consequently, even if relatively small quantities of ingredients are placed in a small, narrow cylindrical container, for example, the ingredients can be mixed together without spilling. Furthermore, because the inner circumferential face of the blade cover is cylindrical, the ingredients can be stirred uniformly.

DESCRIPTION OF THE PREFERRED EMBODIMENTS

Figure 1:
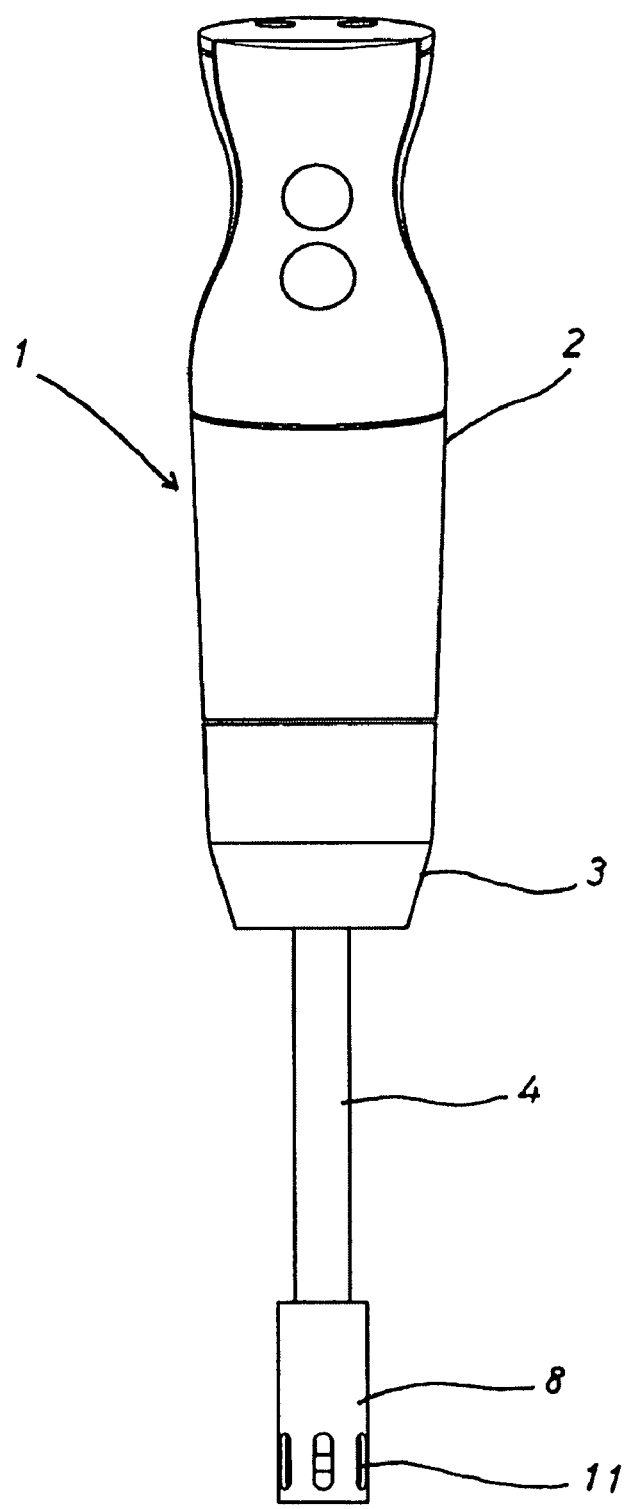
FIG. 1 is a front view of the present invention.
Figure 2:
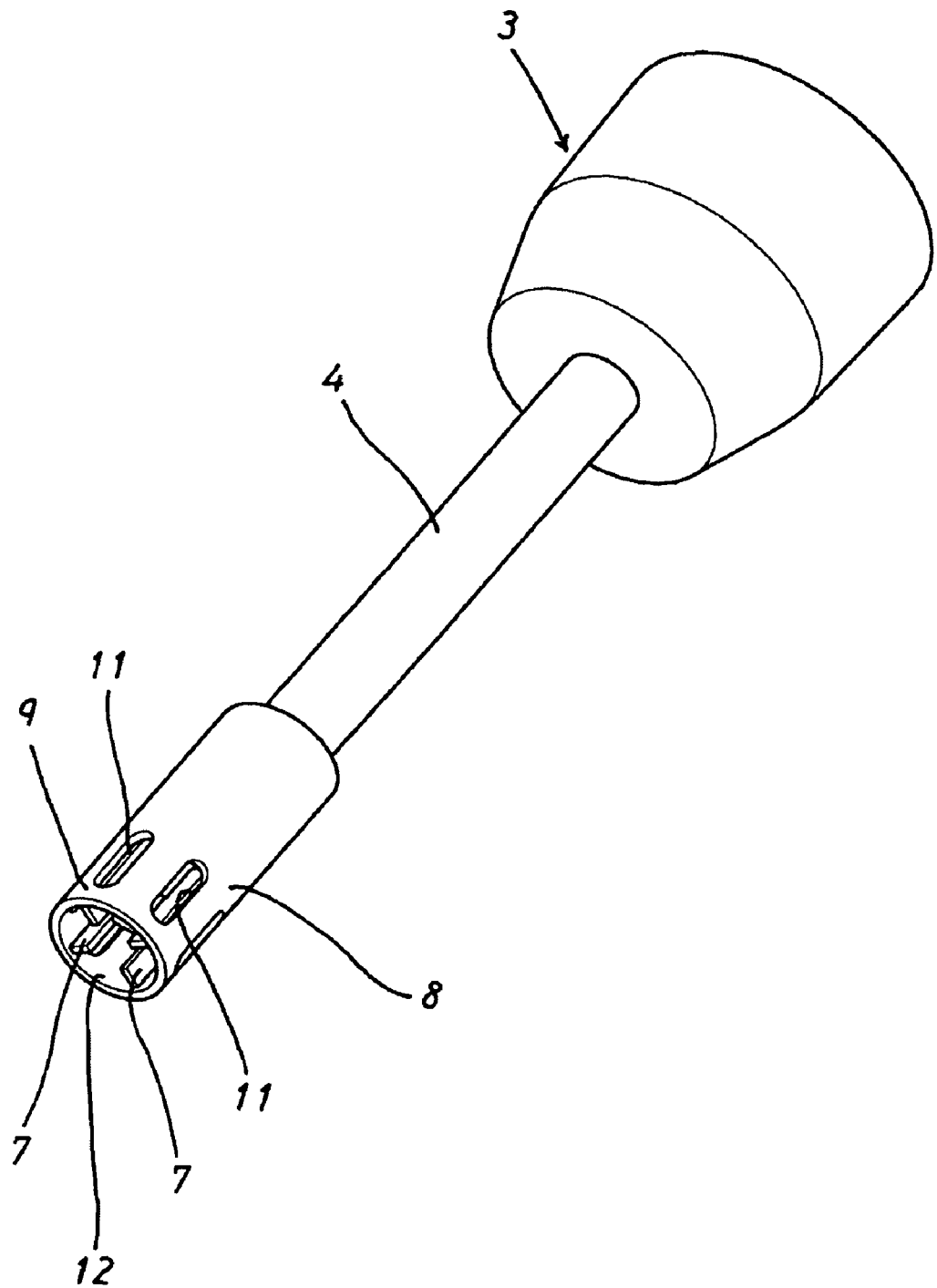
FIG. 2 is a perspective view of an attachment according to the present invention.

Next, embodiments of the present invention are described. The stirring tool 1 of one embodiment is primarily used for preparing fluid or semifluid foods such as mayonnaise and dressing.

Accordingly, the ingredients are generally likewise fluid or semifluid. The stirring tool 1 is driven by way of electric power. The stirring tool 1 comprises a main body 2 and a removable attachment 3. The attachment 3 has an external cylinder 4, and a rotating shaft 5 is inserted into the external cylinder 4. The rotating shaft 5 is coupled to a motor (not shown) which is mounted in the main body 2, and is rotated by the driving power of the motor. The motor rotates at speeds of approximately 10,000 rpm to 20,000 rpm.

Figure 3:
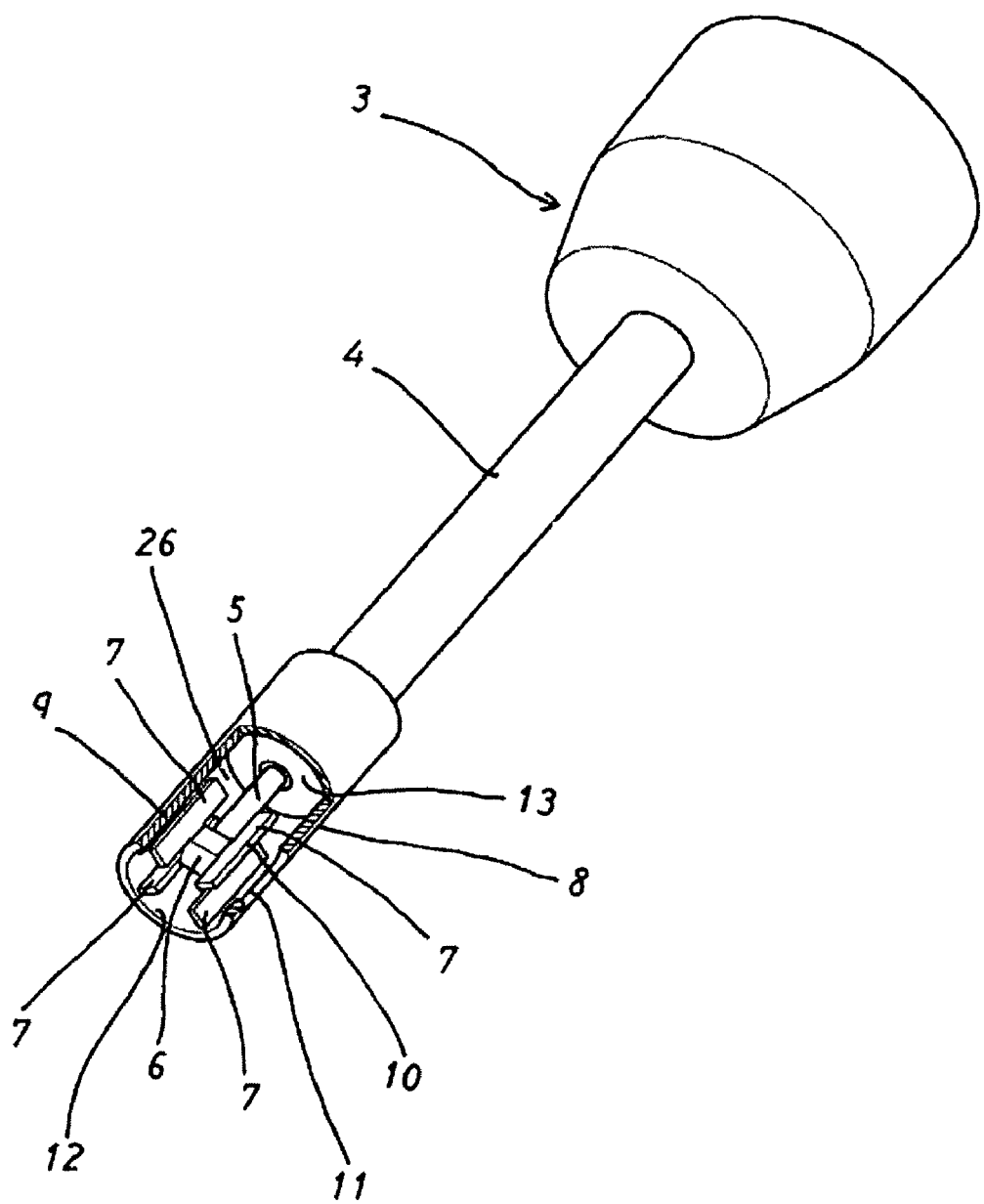
FIG. 3 is a partially cutaway perspective view of an attachment according to the present invention.
Figure 4:
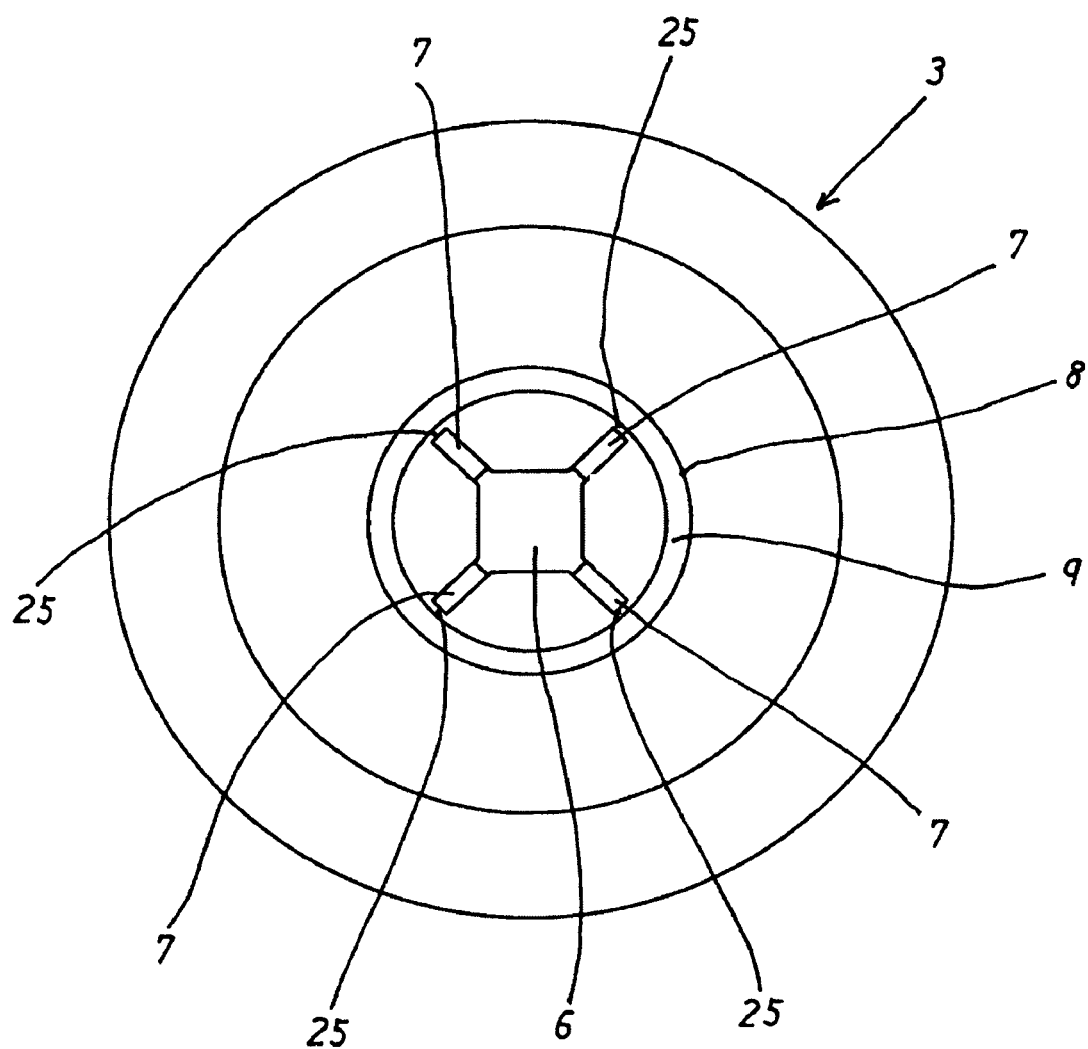
FIG. 4 is an enlarged bottom view of the attachment according to the present invention.

As shown in FIG. 3, a blade mount 6 is fixed to the end of the rotating shaft 5, and four stirring blades 7, 7, 7, 7 are mounted on this blade mount 6. That is to say, the stirring blades 7 are mounted on the rotating shaft 5 by way of the blade mount 6. Accordingly, the stirring blades 7 are mounted on the rotating shaft 5 at a fixed distance from the rotating shaft 5. The stirring blades 7 are in the shape of rectangular plates, and the stirring blades 7 are mounted so that the lengthwise direction of the stirring blades 7 is parallel to the rotating shaft 5. Furthermore, the stirring blades 7 are mounted so as to extend in the radial direction, with the rotating shaft 5 in the center. As shown in FIG. 4, the stirring blades 7, 7, 7, 7 are mounted so as to form a cross.

A cylindrical blade cover 8 is mounted at the end of the external cylinder 4. The blade cover 8 has a cylindrical peripheral wall 9. The face constituted by the inner circumferential face of the blade cover 8 is also cylindrical. The stirring blades 7 rotate at the interior of the peripheral wall 9. The stirring blades 7 have an edge part that faces the inner circumferential face, and extends along the inner circumferential face of the blade cover 8. The edge part that corresponds to this edge part that faces the inner circumferential faces constitutes a straight long edge 10, which extends in the lengthwise direction of the blade cover 8. It is preferable that the width of a gap 25, between this long edge 10 and the inner circumferential face of the blade cover 8, be very small, at no greater than 1.0 mm. It is more preferable that this be 0.3 to 0.7 mm. However, the present invention is not limited to these values. The blade mount 6 described above is provided at a position that is slightly set back from the end of the blade cover 8, so that a space is formed between the blade mount 6 and the end of the blade cover 8. This space makes efficient stirring possible.

Six holes 11, which constitute ingredient circulation openings, are provided, equidistantly spaced in the circumferential direction, in the circumferential wall 9 of the blade cover 8. The holes 11 are elongate holes, which are narrow in the lengthwise direction, which is to say, the axial direction. The holes 11 are shorter than the length, in the axial direction, of the long edges 10 of the stirring blades 7, projected in a direction perpendicular to the rotating shaft 5. Here, because the long edge 10 is parallel to the rotating shaft 5, the length, in the axial direction, of the long edge 10 projected in a direction perpendicular to the rotating shaft 5 is the same as the length of the long edge 10. Supposing that the stirring blade 7 was bent so that the long edge 10 was inclined so as to be slightly reclining, the length of the long edge 10, in the axial direction, projected in a direction perpendicular to the rotating shaft 5 would be shorter than the actual length of the long edge 10. In this mode of embodiment, length of the long edge 10 of the stirring blade 7 is greater than length of the hole 11, with the long edge 10 extending beyond the entire length of the hole 11 in the lengthwise direction thereof. Accordingly, while the stirring blades 7 are rotating, the long edge 10 of the stirring blade 7 can be seen through the hole 11, over the entire length of the hole 11, so that the ingredients are pushed out by the stirring blade 7 through the entire length of the hole 11 in a burst, allowing for effective stirring.

An opening 12 is provided at the bottom of the blade cover 8, which is an opening for circulation of the ingredients. The opening 12 is provided as an opening over the entire area of the bottom of the blade cover 8. By providing the opening 12, the ingredients can flow smoothly into the blade cover 8. A first end of the stirring blade 7 extends as far as a position in the vicinity of the opening 12, while a second end of the stirring blade 7 extends to a position that is short of the ceiling 13 of the blade cover 8, whereby a cavity 26 is formed between the second end of the stirring blade 7 and the ceiling 13 of the blade cover 8. Holes other than the holes 11 may be provided in the peripheral wall 9 that surrounds this cavity 26. As a result, the ingredients can flow in through these other holes as well, which allows for efficient stirring. Note that the outer diameter of the blade cover 8 is approximately 19.5 mm, the length of the long edge 10 of the stirring blade 7 is approximately 17 mm and the thickness of the stirring blade 7 is approximately 1 mm. Furthermore, the length of the hole 11 is approximately 13 mm and the width of the hole 11 in the circumferential direction is approximately 4 mm. However, the present invention is not limited to these values. Materials that do not readily rust, such as stainless steel and titanium, are preferred as materials for the stirring blade 7 and the blade cover 8, but synthetic resins, pure aluminum and materials having surfaces that have been subjected to coating treatments, such as plating, can also be used.

Next, a method of using the present invention is described, with mayonnaise as an example. Egg yolks and salad oil, which are the ingredients for mayonnaise, as well as other ingredients, are placed in a suitable container. Next, the main body 2 of the stirring tool 1 is held in a hand, and the stirring blades 7 and the blade cover 8 are immersed in the ingredients. Next, the motor is turned on by pressing the power switch, so that the stirring blades 7 are caused to rotate. The ingredients flow in by way of the opening 12 and flow out by way of the holes 11, whereby they are efficiently stirred. In particular, the width of the gap 25 between the long edge 10 of the stirring blade 7 and the inner circumferential face of the blade cover 8 is extremely narrow, and the ingredients are mixed together in that extremely narrow region, whereby the ingredients can be more fully mixed together with good efficiency. Furthermore, as described above, the first end of the stirring blade 7 extends as far as a position in the vicinity of the opening 12 and the second end of the stirring blade 7 extends to a position short of the ceiling 13 of the blade cover 8, whereby a cavity 26 is formed between the second end of the stirring blades 7 and the ceiling 13 of the blade cover 8. Accordingly, ingredients are also present in this cavity 26, and the ingredients in the cavity 26 are supplied to the stirring blade 7 in place of ingredients that flow out from the top of the holes 11, as a result of the rotation of the stirring blade 7, whereby efficient stirring is possible. That is to say, due to the presence of the cavity 26, ingredients that have flown in via opening 12 can transit the cavity 26 and flow out via the tops of the holes 11, whereby circulation of the ingredients is enhanced.

Furthermore, as described above, the stirring blades 7 are mounted on the rotating shaft 5 by way of the blade mount 6. Accordingly, the stirring blades 7 are mounted on the rotating shaft 5 at a fixed distance from the rotating shaft 5. Consequently, a gap is formed between the stirring blade 7 and the rotating shaft 5, and the ingredients are also stirred as a result of passing through this gap, which further activates ingredient circulation.

Figure 5:
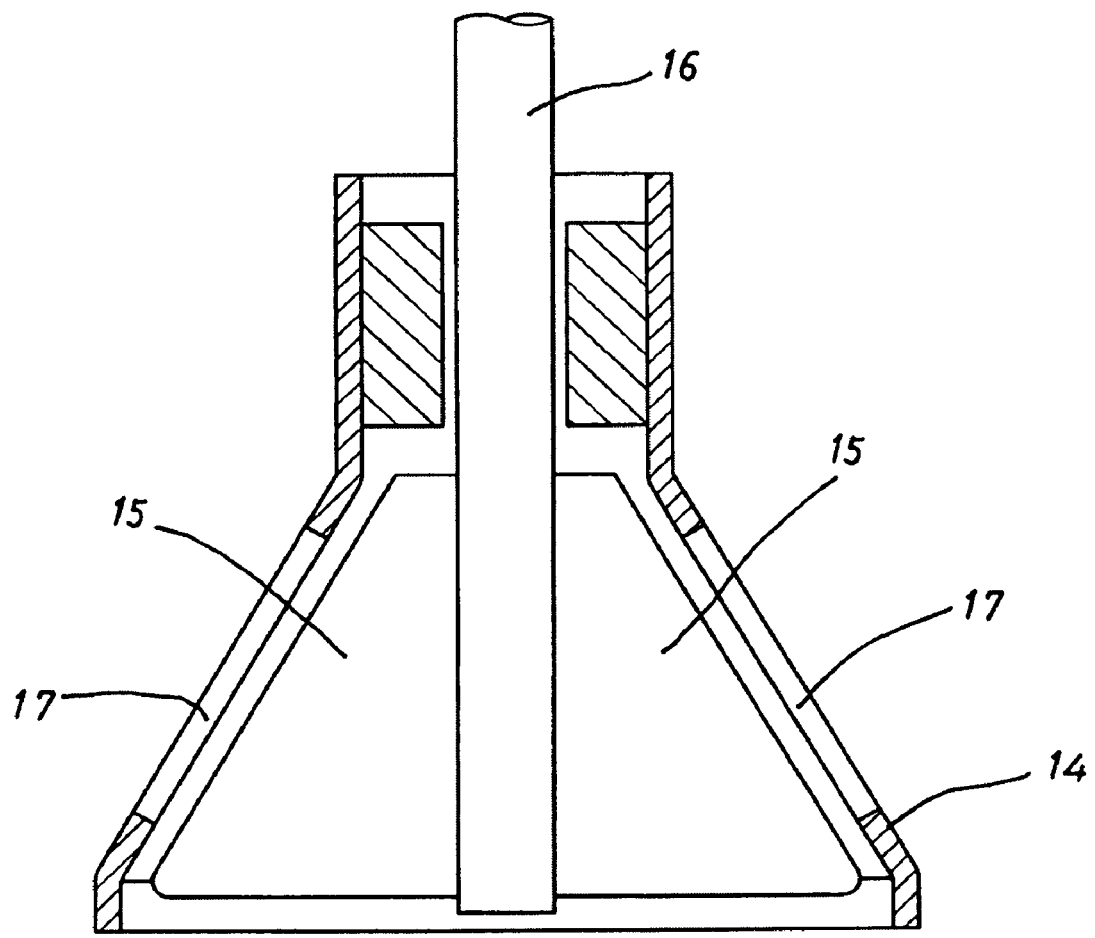
FIG. 5 is a partial sectional view showing another embodiment of an attachment according to the present invention.

FIG. 5 shows another embodiment of the blade cover and the stirring blades of the present invention. The blade cover 14 is formed in a truncated conical shape and the stirring blades 15, 15 are formed so as to be increasingly wide in the downward direction, so as to follow the inner circumferential face of the blade cover 14. The two stirring blades 15 are mounted directly on a rotating shaft 16. Furthermore, four holes 17 are provided in the blade cover 14.

Figure 6:
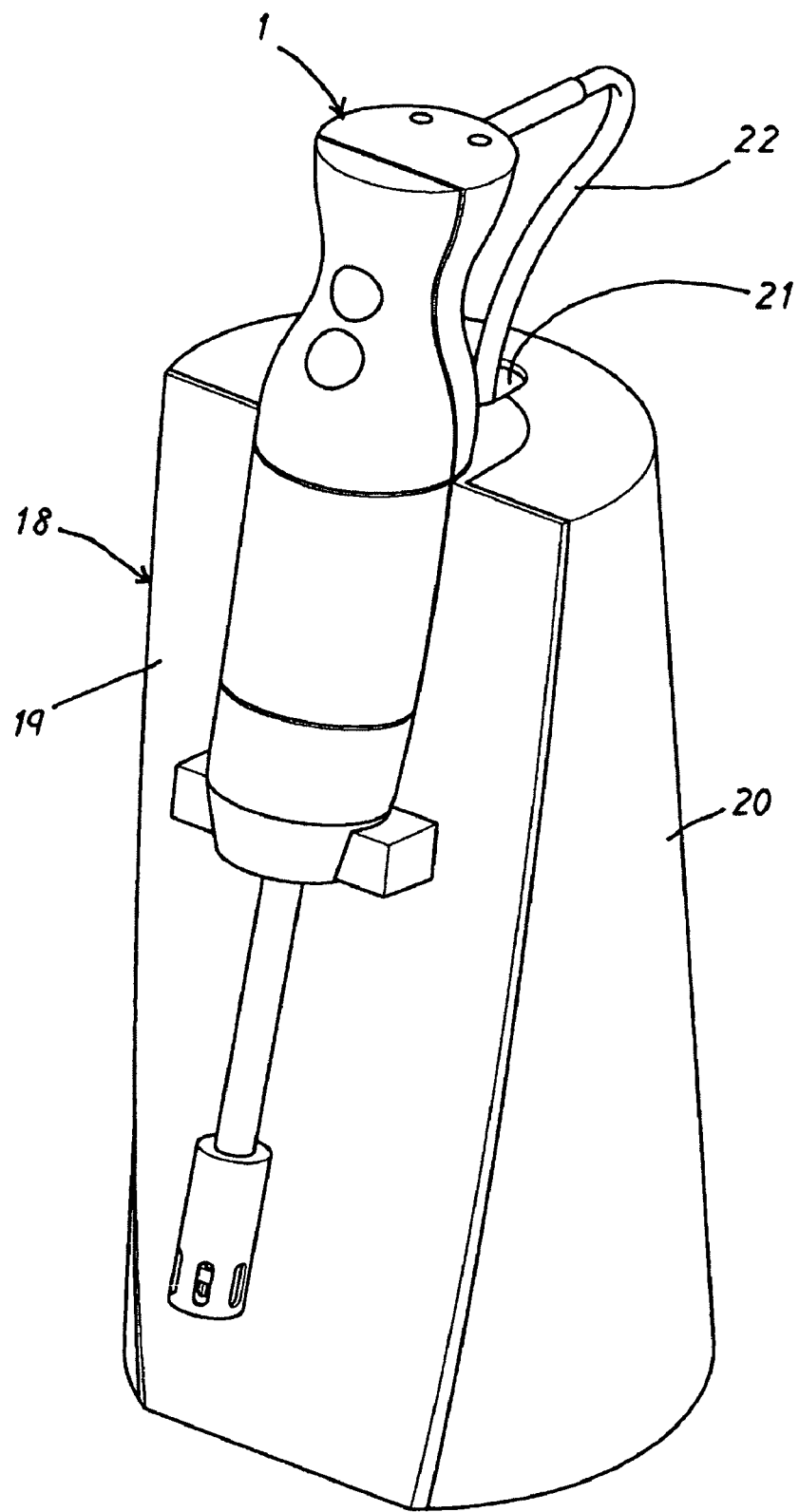
FIG. 6 is a perspective view of the present invention when stowed on a stand.
Figure 7:
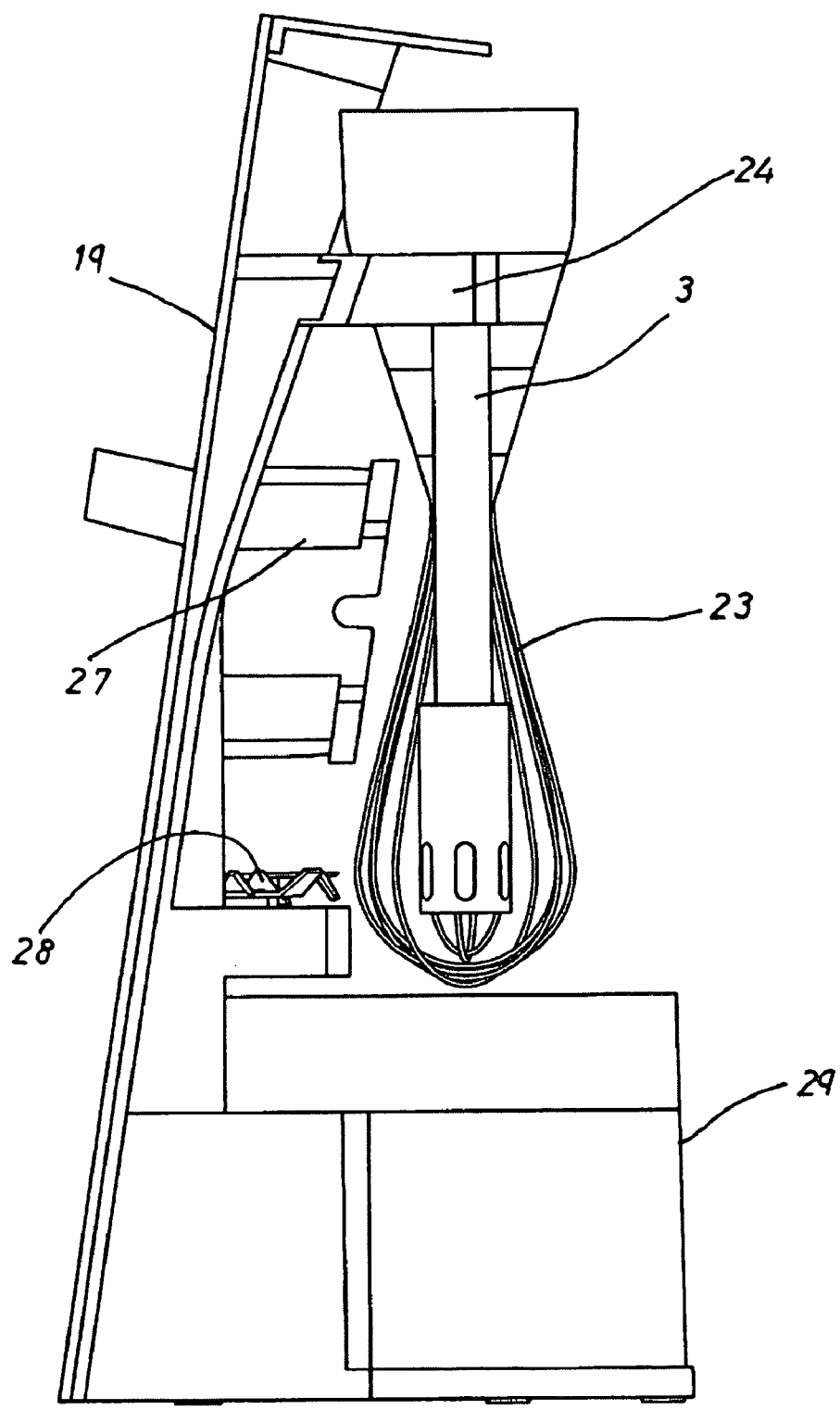
FIG. 7 is a side view showing the inside of the stand with the stand cover removed.

FIG. 6 shows the stirring tool 1 when stowed on a stand 18. The stand 18 comprises a main stand body 19 and a cover 20. The cover 20 gives the overall stand 18 a clean appearance. Furthermore, this prevents dust and the like from getting into the stand 18. The cover 20 can be removed from the main stand body 19 by lifting it upwards. A cord pass-through hole 21 is provided in the top face of the stand 18 and a cord 22 of the stirring tool 1 passes through this cord pass-through hole 21 and can be stored by way of winding it on a cord winding part 27. FIG. 7 shows the stand 18 with the cover 20 removed. Two attachments 3, 23 can each be hung from hanging mounts 24 at the interior of the stand 18. The attachment 23 is for whipping. Reference numeral 28 indicates a rotary preparation blade, which is stored within the stand 18 and can be used for processing ingredients such as meat and vegetables by way of crushing and chopping, when mounted on an attachment (not shown). Reference numeral 29 indicates a grinding container, which is stored within the stand 18. Beans, small fish, sesame seeds and the like are placed in this grinding container, and the end of an attachment onto which a grinding blade has been mounted is engaged with the lid of the grinding container so that the grinding blade is at the interior of the container, whereby grinding can be performed.

Note that many different modes are possible for the present invention on the basis of the constitution described above. For example, rather than holes, the openings for ingredient circulation that are provided in the circumferential wall 9 of the blade cover 8 may be a U-shaped cutaway openings that extend as far as the opening 12, and may be inclined with respect to, rather than parallel to, the orientation of the rotating shaft. As for the number of stirring blades 7, this may be the same as the number of holes provided in the circumferential wall 9 of the blade cover 8, or a greater number. The length of the long edge 10 of the stirring blades 7 may be equal to the length of the hole 11, or may be shorter than this. The second end of the stirring blades 7 may extend so as to be close to the ceiling 13 of the blade cover 8, without a cavity being formed between the second end of the stirring blades 7 and the ceiling 13 of the blade cover 8. Instead of the stirring tool 1 being of the attachment type, the external cylinder 4 and the blade cover 8 may be permanently mounted on the stirring tool 1. The stirring blades 7 may also be manually rotated.

By providing a blade cover which covers the periphery of the stirring blades and providing openings for circulation of the ingredients in the circumferential wall of the blade cover, it is possible to provide a stirring tool whereby the ingredients are fully mixed together with good efficiency.

EXPLANATION OF THE REFERENCE NUMERALS 1 stirring tool
2 main body
3 attachment
4 external cylinder
5 rotating shaft
6 blade mount
7 stirring blade
8 blade cover
9 peripheral wall
10 long edge
11 hole
12 opening
13 ceiling
14 blade cover
15 stirring blade
16 rotating shaft
17 hole
18 stand
19 main stand body
20 cover
21 cord pass-through hole
22 cord
23 attachment
24 hanging mount
25 gap
26 cavity
27 cord winding part
28 rotary preparation blade
29 grinding container

The invention claimed is:

1. A stirring tool for preparing food, comprising:
a stirring blade mounted on a blade mount, the blade mount being fixed to a rotating shaft, the stirring blade being rotated by a driving force; and
a hollow blade cover which covers a periphery of the stirring blade;
wherein the stirring blade is formed in the shape of a rectangular plate, and a portion of a radially inward edge of the stirring blade is joined with the blade mount, said portion of the radially inward edge extending in a lengthwise direction along the blade mount;
wherein the stirring blade has an edge part that faces an inner circumferential face of the blade cover and extends adjacent to the inner circumferential face; and
wherein the blade cover has openings at the end of the blade cover and in a peripheral wall of the blade cover for circulation of the stirred ingredients, at least a portion of the said edge part that faces the inner circumferential face can be seen through an opening when the rotating blade rotates.

2. The stirring tool recited in claim 1, wherein the opening provided in the peripheral wall of the blade cover is a hole.

3. The stirring tool recited in claim 2, wherein the hole is formed so as to be elongate in the direction of the axis of rotation.

4. The stirring tool recited in claim 3,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

5. The stirring tool recited in claim 2 wherein the axial length of said edge part that faces the inner circumferential face, projected in a direction perpendicular to the axis of rotation, is no less than the axial length of the hole, and the portion corresponding to the axial length of said edge part that faces the inner circumferential face, projected in a direction perpendicular to the axis, extends over the entire axial length of said hole.

6. The stirring tool recited in claim 5,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

7. The stirring tool recited in claim 2,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

8. The stirring tool recited in claim 1, wherein a gap between the edge part that faces the inner circumferential face and the inner circumferential face of the blade cover is no greater than 1.0 mm.

9. The stirring tool recited in claim 8,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

10. The stirring tool recited in claim 1, wherein the number of stirring blades is less than the number of openings provided in the peripheral wall of the blade cover.

11. The stirring tool recited in claim 10,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

12. The stirring tool recited in claim 1, wherein the plane constituted by the inner circumferential face of the blade cover is cylindrical.

13. The stirring tool recited in claim 12,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

14. The stirring tool recited in claim 1,
wherein the blade mount is affixed to an end of the rotating shaft and four stirring blades are mounted on the blade mount;
wherein the stirring blades are mounted at a fixed distance from the rotating shaft;
wherein the stirring blades are parallel to the rotating shaft in the lengthwise directions thereof; and
wherein the four stirring blades are mounted so as to extend in the radial direction, so as to form a cross with the rotating shaft in the center.

15. The stirring tool recited in claim 1, wherein said portion of the radially inward edge is part of a longer edge dimension of the rectangular blade relative to a shorter edge dimension of the rectangular blade.

16. The stirring tool recited in claim 15, wherein said rectangular plate is sized and oriented in a manner so as not to completely block an axially-extending opening among said openings in the peripheral wall of the blade cover when the rotating blade rotates.

\* \* \* \* \*